(12) United States Patent
Midorikawa

(10) Patent No.: US 6,184,785 B1
(45) Date of Patent: Feb. 6, 2001

(54) SEATBELT DEVICE

(75) Inventor: Yukinori Midorikawa, Fujisawa (JP)

(73) Assignee: NSK Ltd., Tokyo (JP)

( * ) Notice: Under 35 U.S.C. 154(b), the term of this patent shall be extended for 0 days.

(21) Appl. No.: 09/488,120

(22) Filed: Jan. 20, 2000

(30) Foreign Application Priority Data

| Jan. 21, 1999 | (JP) | 11-012678 |
| Jan. 22, 1999 | (JP) | 11-014233 |
| Jan. 28, 1999 | (JP) | 11-019845 |
| Aug. 4, 1999 | (JP) | 11-221690 |

(51) Int. Cl.[7] .................................................. B60Q 1/00
(52) U.S. Cl. ...................... 340/457.1; 340/457; 280/804; 280/806
(58) Field of Search ................................ 340/457.1, 457; 701/45, 46, 47; 280/728.1, 735, 806, 804; 24/633

(56) References Cited

U.S. PATENT DOCUMENTS

| 3,806,867 | | 4/1974 | Quantz | 340/457.1 |
| 4,885,566 | * | 12/1989 | Aoki et al. | 340/457.1 |
| 4,943,087 | * | 7/1990 | Sasaki | 280/804 |
| 5,413,378 | * | 5/1995 | Steffens, Jr. et al. | 280/735 |
| 5,446,661 | | 8/1995 | Gioutsos et al. | 364/424.05 |
| 5,634,664 | * | 6/1997 | Seki et al. | 280/806 |
| 5,636,864 | * | 6/1997 | Hori | 280/735 |
| 5,742,986 | | 4/1998 | Corrion et al. | 24/633 |
| 5,915,286 | * | 6/1998 | Figi et al. | 73/865.9 |
| 5,966,784 | * | 10/1999 | Arbogast et al. | 24/633 |
| 5,970,587 | * | 10/1999 | Knox | 24/633 |
| 6,026,340 | * | 9/2000 | Corrado et al. | 701/47 |

FOREIGN PATENT DOCUMENTS

| 51-28229 | 3/1976 | (JP) . |
| 61-187765 | 11/1986 | (JP) . |
| 62-192119 | 8/1987 | (JP) . |
| 63-190934 | 12/1988 | (JP) . |
| 2-31964 | 2/1990 | (JP) . |
| 7-101303 | 4/1995 | (JP) . |
| 9-20194 | 1/1997 | (JP) . |
| 10-152020 | 6/1998 | (JP) . |
| 11-11256 | 1/1999 | (JP) . |

* cited by examiner

Primary Examiner—Jeffery A. Hofsass
Assistant Examiner—Phung Nguyen
(74) Attorney, Agent, or Firm—Evenson, McKeown, Edwards & Lenahan, P.L.L.C.

(57) ABSTRACT

Provided is a seatbelt device comprising a passenger detector not easily affected by the sitting position or posture of the passenger. This seatbelt device comprises a buckle (17) freely connectable with a tongue plate (16) mounted on a webbing (15), a buckle supporter (18) for supporting the buckle (17) provided at the side of the seat (12) to be in a position at the side of the passenger, and a detector (17b) provided inside the buckle (17) for detecting the existence of the passenger.

9 Claims, 16 Drawing Sheets

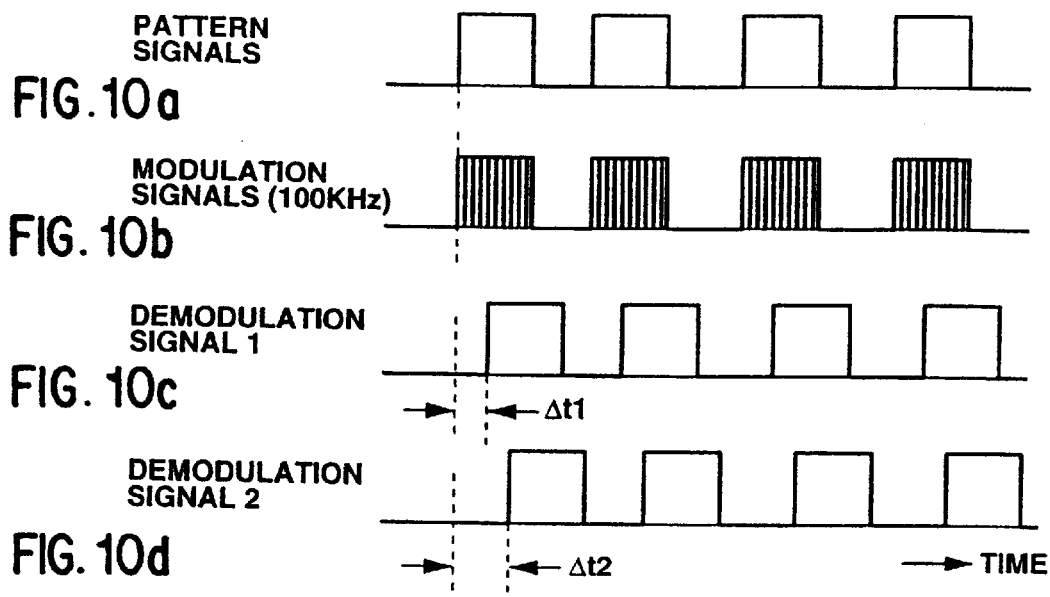
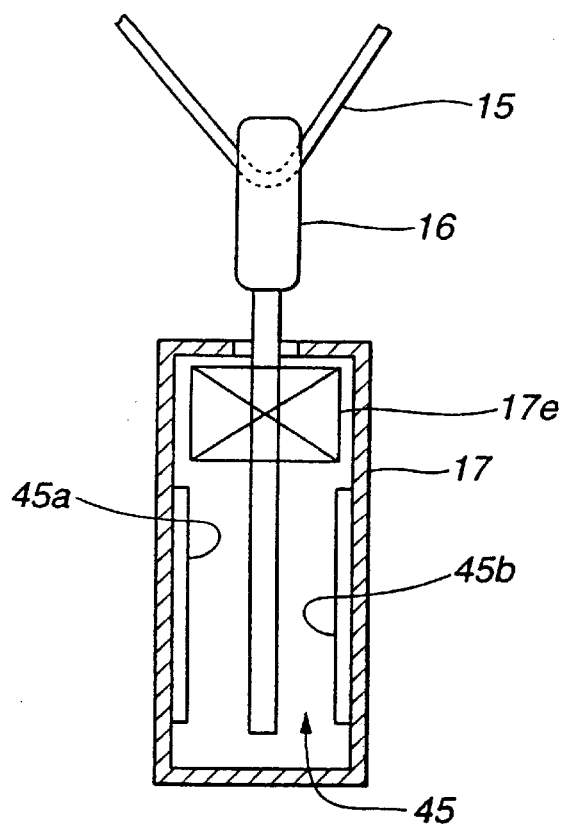

MAGNETIC FORCE
OF EXCITATION COIL

MAGNETIC SENSOR OUTPUT
(TONGEU PLATE NOT INSERTED)

MAGNETIC SENSOR OUTPUT
(TONGEU PLATE INSERTED)

→ TIME

| OUTPUT a | OUTPUT b | OUTPUT c | JUDGMENT RESULTS |
|---|---|---|---|
| H | H | H | SMALL INDUCTANCE - MALFUNCTION |
| L | H | H | NORMAL INDUCTANCE - UNFASTENED STATE OF WEBBING |
| L | L | H | NORMAL INDUCTANCE - FASTENED STATE OF WEBBING |
| L | L | L | LARGE INDUCTANCE - MALFUNCTION |

| IC1 OUTPUT | IC2 OUTPUT | JUDGMENT RESULTS |
|---|---|---|
| H | L | UNFASTENED STATE |
| L | H | FASTENED STATE |
| H | H | MALFUNCTION |
| L | L | MALFUNCTION |

SEATBELT DEVICE

BACKGROUND OF THE INVENTION

1. Field of the Invention

The present invention generally relates to a seatbelt device seeking the safety of a passenger by securing such passenger to a vehicle seat with a webbing (seatbelt), and particularly relates to a seatbelt device capable of controlling the operation of the collision-safety mechanism by providing to a buckle a function of detecting the passenger sitting in a seat or the fastening of a webbing.

2. Description of the Related Art

As an example of a conventional passenger detector for detecting the passenger in a vehicle, there is Japanese Patent Laid-Open Publication No. Hei 2-31964. This invention is provided with a supersonic sensor on the inner side of the door, and detects the existence of a passenger by utilizing the supersonic signals emitted from the supersonic sensor and the supersonic signals entering the supersonic sensor upon being reflected by the passenger.

Further, the invention of Japanese Patent Laid-Open Publication No. Hei 9-20194 proposes a structure wherein a sensor for detecting the passenger is arranged on the upper face of the dashboard and uses the inclined windshield as the sensor wave reflector so as to avoid the complexity of the cable wiring of supersonic sensors provided on the inner side of doors, and to seek and secure excellent reliability.

Moreover, detection of the fastening of a webbing is vital in a seatbelt device, and, for example, is conducted with a buckle switch provided within the buckle that engages with a tongue plate. A buckle sensor used for detecting the fastening of such webbing is demanded of high reliability in order to protect the passenger.

Nevertheless, with conventional passenger sensors arranged inside doors and on dashboards, the distance from the sensor to the passenger or the principle emission direction of the sensor wave and the passenger position is displaced upon the passenger sliding one's seat or reclining the backrest. Thus, in order to accurately detect the passenger, parameters such as the scope (sensitivity, directivity) of sensor detection distance must be corrected in conformity with the displacement of such sliding or reclining.

In addition, conventional buckle sensors did not go as far as to confirm whether the buckle switch was operating normally. One reason for this was due to the diagnosis of a buckle switch malfunction requiring a complex structure that would enable the compulsorily closing or opening of the buckle switch. Thus, such structure would not fit inside the buckle, or would make the buckle excessively large.

Moreover, it would be costly if the passenger sensor and buckle sensor were to be installed separately.

SUMMARY OF THE INVENTION

Accordingly, an object of the present invention is to provide a seatbelt device comprising a passenger detector not easily affected by the sitting position or posture of the passenger.

Another object of the present invention is to provide a seatbelt device capable of diagnosing the malfunction of the seatbelt detector.

Still another object of the present invention is to provide a seatbelt device capable of detecting both the existence of a passenger and the fastening of a webbing.

The present invention for achieving the aforementioned objects is a seatbelt device for securing a passenger to a seat with a webbing, comprising: a tongue plate mounted on the webbing; a buckle which engages with the tongue plate and fastens the webbing to the passenger; and a passenger detector for detecting the existence of the passenger in the seat; wherein the passenger detector is provided inside the buckle.

By providing a passenger sensor to the buckle as mentioned above, the existence of the passenger may be detected when such passenger sits in his/her seat regardless of the sliding position or the reclining state of the seat. Thus, passenger detection may be conducted with more certainty.

Preferably, the seatbelt device comprises a control circuit for changing the threshold, which prevents the unnecessary activation of webbing locking or airbags upon collision, pursuant to detection signals showing the existence of a passenger. This control circuit further prevents unnecessary activation of webbing locking or airbags in consideration of the fastened or unfastened state of the webbing.

Preferably, the buckle is positioned at the side of the sitting passenger and supported in a position such that the passenger detector is capable of detecting the passenger. Further, the passenger detector may be provided to the face of the buckle facing the passenger and output sensor waves from a window of such face. The passenger detector includes an infrared sensor for detecting infrared rays emitted from the passenger. For example, this may be a pyroelectric infrared detector for detecting infrared rays via a filter for extruding infrared rays within wavelengths generated from a human body. With this detector, the fluctuation of temperatures (undulation of heat rays) caused by minute movements of the human body is also detected, and detection with minimal error is possible.

The passenger detector may be a sensor which discharges electromagnetic waves containing supersonic waves or light and detects the existence of a passenger pursuant to the reflective waves reflected by the passenger.

Preferably, a webbing fastening detector for detecting the engagement of the tongue plate and the buckle is further provided inside the buckle.

With this structure, the results of passenger existence and the fastened state of the webbing obtained by the passenger detector may be utilized for controlling the vehicle safety system seeking the safety of passengers, such as activation/non-activation of a webbing-locking mechanism of the pretensioner, activation/non-activation of the webbing tension unit, judgement of the activation/non-activation of an airbag, alteration of the threshold of such judgement, and so on.

Preferably, the webbing fastening detector includes: a non-contact detector provided inside the buckle and for generating, without contacting the tongue plate, the output corresponding to the existence of the tongue plate in the position where the tongue plate and the stopper mechanism of the buckle should engage; and a judgment element for judging the engagement/non-engagement of the tongue plate and the buckle from the output of the non-contact detector.

For example, the webbing fastening detector includes: a first magnet provided inside the buckle and which moves in correspondence with the engagement of the buckle and the stopper mechanism of the buckle; a second magnet provided and secured inside the buckle; first and second magnetic sensors provided inside the buckle and arranged such that they detect the intensity of the magnetic field of the first magnet and the second magnet, become outputs that mutually and complementarily change during the engagement/non-engagement of the tongue plate, and generate outputs mutually contracting with each other even in the respective engagement states; and a judgment unit for judging the engagement/non-engagement of the tongue plate and the buckle from the respective outputs of the first and second magnetic sensors. The first and secondmagnetic sensors are, for example, a hall IC, or MR IC.

The present invention is a seatbelt device for securing a passenger to a seat with a webbing, comprising: a buckle capable of freely engaging with a tongue plate mounted on the webbing; a coil spring provided inside the buckle and which expands and contracts in correspondence with the engagement with the tongue plate; an inductance detector for obtaining the output corresponding to the inductance of the coil spring; and a judgment unit for judging that a webbing has been fastened when the output of the inductance detector is within a prescribed range.

Preferably, the judgment unit judges that a webbing has been fastened when the output of the inductance detector is within a first range, that a webbing has not been fastened when the output is within a second range, and that there is a malfunction when the output is within a third range.

With this structure, the inductance value may be changed in a wide range pursuant to the expansion and contraction of the coil spring. The malfunction of the webbing fastening detector may be diagnosed pursuant to whether the inductance value is within a prescribed range normally used.

The present invention is a seatbelt device for securing a passenger to a seat with a webbing, comprising: a buckle sensor (webbing fastening detector) for detecting the engagement of a tongue plate mounted on the webbing and a buckle arranged at the side of a seat; and a malfunction detector for detecting a malfunction in the operation of the webbing fastening detector.

With this structure, a system for warning the malfunction of the buckle sensor is obtained.

BRIEF DESCRIPTION OF THE DRAWINGS

FIG. 7 is a flowchart explaining an example of processing using the respective outputs of the passenger sensor 17b and the buckle sensor 17a;

FIGS. 10a, 10b, 10c, and 10d is signal waveform chart explaining partial signals of the signal processing system shown in FIG. 9;

FIG. 11 is a diagram explaining an example of a sensor for detecting the fastening of a webbing pursuant to the capacitance;

DETAILED DESCRIPTION OF THE PREFERRED EMBODIMENTS

Figure 1:
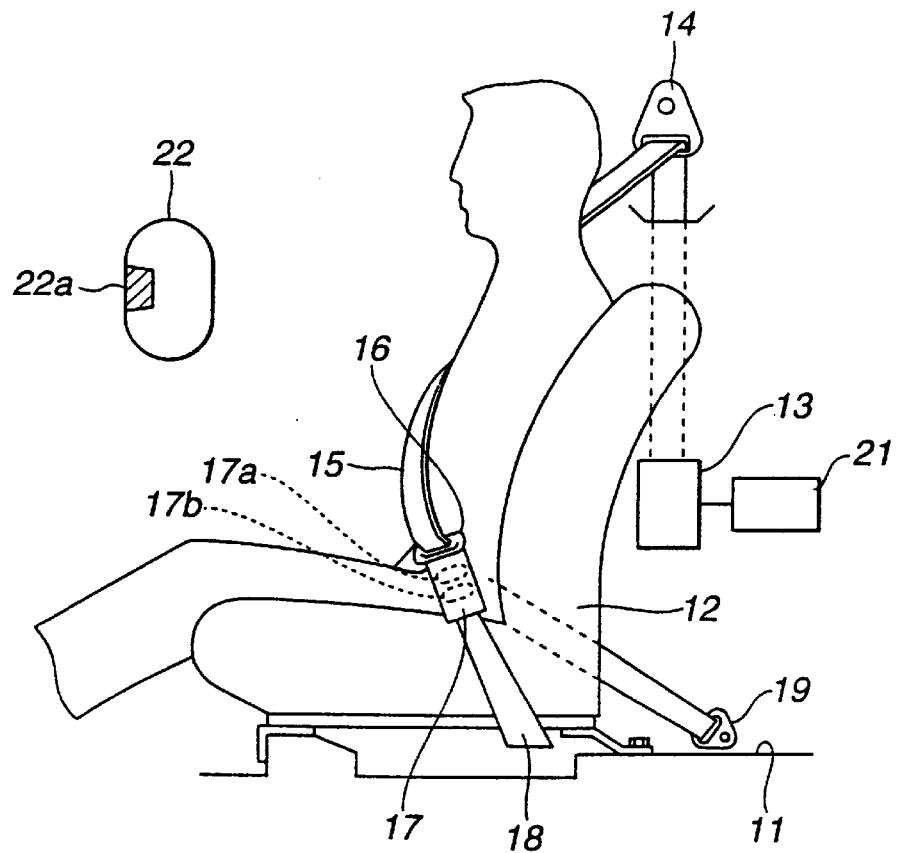
FIG. 1 is a diagram explaining the outline of the seatbelt device.

Next, the embodiments of the present invention are explained below with reference to the relevant drawings. FIG. 1 shows an outline of the seatbelt device comprising a mechanism for seeking the safety of a passenger.

In FIG. 1, a seat 12 is mounted slidably in the forward/backward direction on a body 12 of a vehicle. A webbing winder 13 for winding one end of a webbing (seatbelt) is mounted on the vehicle body wall toward the side of the seat 12. The webbing winder 13 internally comprises a winding spring (not shown) for removing the excess slack of the webbing 15 and an emergency locking mechanism (not shown) which is activated upon sensing the acceleration working on the vehicle body or the retractive acceleration of the webbing. The webbing winder 13 further comprises a pretensioner (not shown) for retracting the webbing 15 by utilizing the explosive power of powder upon a vehicle collision. The structure of the pretensioner, for example, may be the one described in Japanese Patent Laid-Open Publication No. Hei 10-152020. When the collision detector (equivalent to the acceleration sensor 41 and controller 40 explained later) determines that the activation of the pretensioner is necessary, an ignition current is supplied from the collision detector to the pretensioner activator (gas generator) 21 inside the pretensioner. Then, the squib (ignition powder) inside the combustion chamber is ignited, the activation powder is ignited thereby, and combustion gas is generated. The pressure inside the combustion chamber rises pursuant to the gas, and the webbing winding shaft rotates due to this pressure, and the webbing 15 is thereby wound.

One end of the webbing 15, wherein the other end thereof is wound by the webbing winder 13, is folded back via a belt supporter 14, and is mounted on the vehicle body 11 by an anchor fitting 19. A tongue plate 16 to which the webbing passes through is mounted on the middle of the webbing 15. The tongue plate 16 engages (or connects) with the buckle 17 explained later upon being inserted thereinto. Thereby, the webbing 15 in a shoulder-sash arrangement secures the passenger in the seat 12, and the fastening of the webbing 15 is complete.

Figure 2:
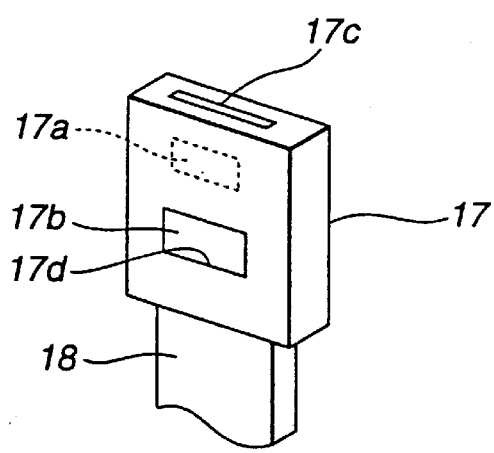
FIG. 2 is a perspective view explaining the buckle 17 comprising a passenger sensor 17b for detecting the existence of a passenger and a buckle sensor 17a for detecting the fastening of a webbing.

FIG. 2 shows an example of the buckle 17. In this example, a buckle switch 17a and a passenger sensor 17b are both built in the buckle 17.

The buckle switch 17a, which is a buckle sensor for detecting the fastened or unfastened state of the webbing, detects the engagement (or connection) of the tongue plate 16 inserted into the tongue plate insertion opening 17a and the buckle 17, and generates webbing fastening signals representing the fastening of a webbing.

The passenger sensor 17b detects the existence of the sitting passenger via a window 17d provided on the passenger side of the buckle 17. The passenger sensor 17b, for example, may be an infrared sensor. An infrared sensor, for example, is a pyroelectric infrared sensor, and comprises a low wavelength cutoff filter for removing rays other than the infrared rays generated from the human body. This filter is capable of cutting wavelengths under 7 μm, such as sunlight. With a pyroelectric infrared sensor, changes in the amount of infrared rays are expressed as output voltage. Although this sensor generates voltage above a prescribed value with respect to infrared emitting bodies such as a passenger (person) who is always showing some type of slight motion, it does not react to objects that do not generate infrared rays, wavelengths under 7 μm, or inanimate objects that are always still, and it does not generate voltage above a prescribed value.

Figure 3A:
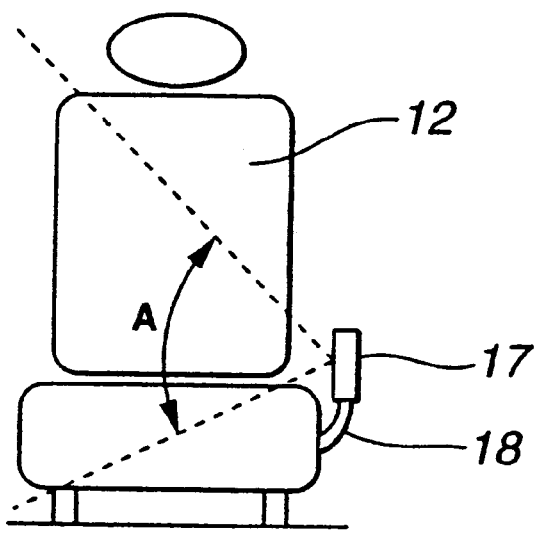
FIGS. 3a and 3b is a diagram explaining the position arrangement of the passenger sensor 17.
Figure 3B:
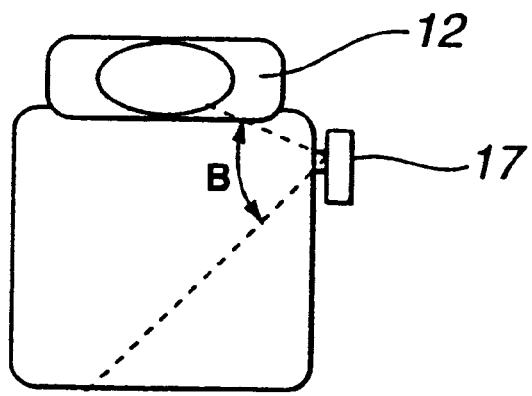

As shown in FIG. 1, front view of the seat in FIG. 3(a), and top view of the seat in FIG. 3(b), the buckle 17 is supported by the buckle supporter 18 to be in a position at approximately the waist of the passenger at the side of the seat 12. Used as the buckle supporter 18 maybe, for example, a steel plate covered with plastic or steel wire covered with plastic to have flexibility. The vertical detection angle (detection range) A and the horizontal detection angle B of the passenger sensor 17b of the buckle 17 are set in correspondence with the existent range of the passenger.

An airbag device 22 is provided at the center of the steering wheel or the dashboard side of the vehicle. The airbag device 22, for example, may be of a structure as described in Japanese Patent Laid-Open Publication No. Hei 7-101303. An airbag activator (inflater) 22a, which ignites powder and generates high-pressure gas for inflating the airbag, is provided within the airbag device 22.

Figure 4:
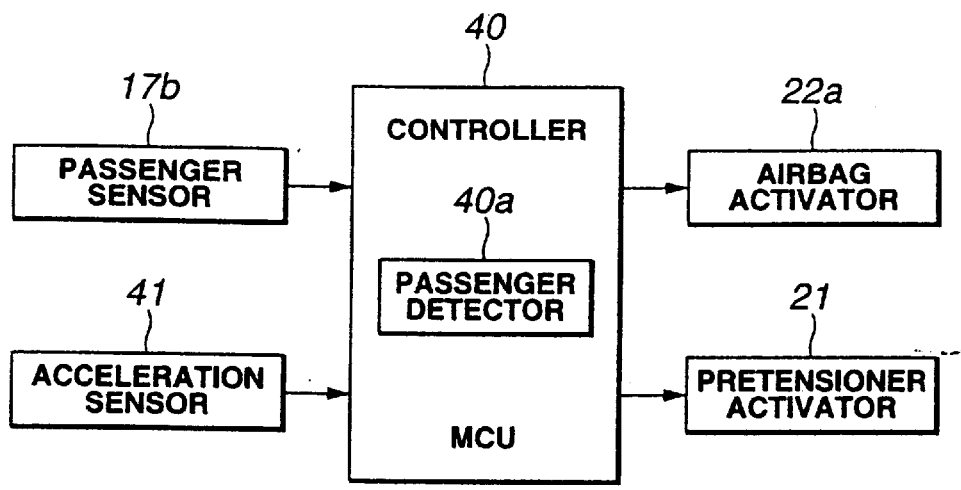
FIG. 4 is a block diagram explaining the control system of the seatbelt device.

FIG. 4 is a block diagram explaining the first control mode of the control system of the seatbelt device.

In FIG. 4, the controller 40 is structured of, although not shown, a microcomputer system comprising a CPU, ROM, RAM, interface, etc. Preferably, the controller 40 is structured of a micro-controller (MCU) having the respective components integrated on a single chip. Formed to the controller 40 is a passenger detector 40a pursuant to a control program, and determines the existence of the passenger by distinguishing the level of the voltage output from the passenger sensor (infrared sensor) 17b.

The controller 40 distinguishes the existence, degree, etc. of collision pursuant to the output pattern of the acceleration sensor 41 provided to the vehicle. Upon determining a collision, the controller 40 activates either the pretensioner activator (gas generator) 21 or the airbag activator 22a, or both, in accordance with the degree of impact. Pursuant to the activation of the pretensioner activator 21, the pretensioner is activated, the webbing 15 is wound due to the compulsory rotation of the winding shaft of the webbing winder in the webbing-winding direction, and the passenger is secured to the seat 12. Furthermore, pursuant to the activation of the airbag activator 22a, powder is combusted, expansion gas is generated, and the airbag 22 is instantaneously inflated. This prevents secondary collision of passengers.

Upon the aforementioned passenger-protection operation, the controller 40 refers the voltage output to the passenger sensor 17b, changes the standard value (threshold) of the distinction in accordance with the existence of a passenger, and prevents accidental activation and unnecessary operations.

Figure 5:
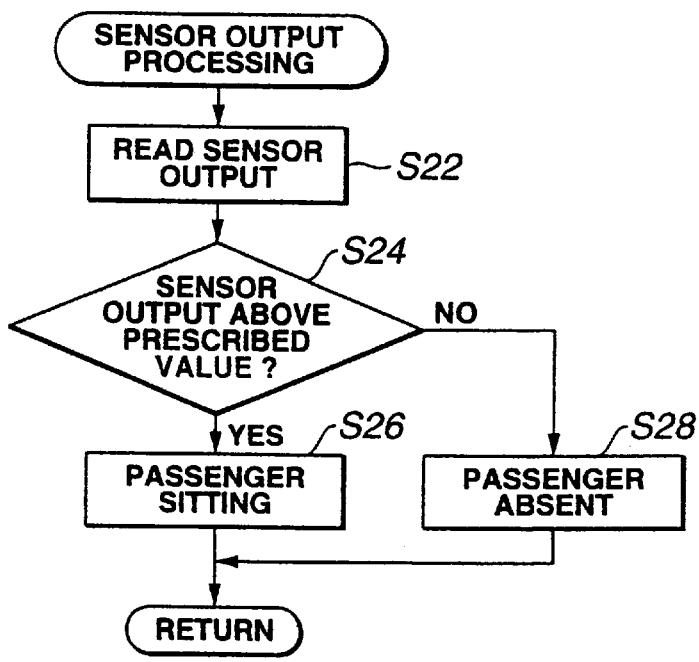
FIG. 5 is a flowchart explaining an example of output processing of the passenger sensor 17b.

FIG. 5 is a flowchart explaining the operation of the CPU corresponding to the passenger detector 40a of the controller 40.

Foremost, the output voltage of the passenger sensor 17b is made into data via the interface when the engine is turned on or per prescribed cycle, such data is written in a prescribed area of the RAM pursuant to the DMA operation, and the interruption flag is set to "on." Thereby, the CPU begins the output processing of the passenger sensor 17b.

The CPU reads the output of the passenger sensor 17b from the prescribed area of the RAM (S22) and distinguishes whether the sensor output is higher than the prescribed value set in advance as the threshold (S24). When the output is higher than the prescribed value (S24; Yes), the CPU determines that a passenger is existent (sitting). The CPU then sets a passenger flag, which represents the passenger's existence of the condition register not shown, to "off," resets the aforementioned interruption flag and returns to the original processing (S26). When the output is lower than the prescribed value (S24; No), the CPU determines that a passenger is not existent (sitting). The CPU then sets a passenger flag, which represents the passenger's existence of the condition register, to "off," resets the aforementioned interruption flag and returns to the original processing (S28).

Accordingly, the CPU distinguishes the existence of a passenger, and uses this result (on/off of the passenger flag) for the determination routine of deciding whether to activate the safety device not shown.

Figure 6:
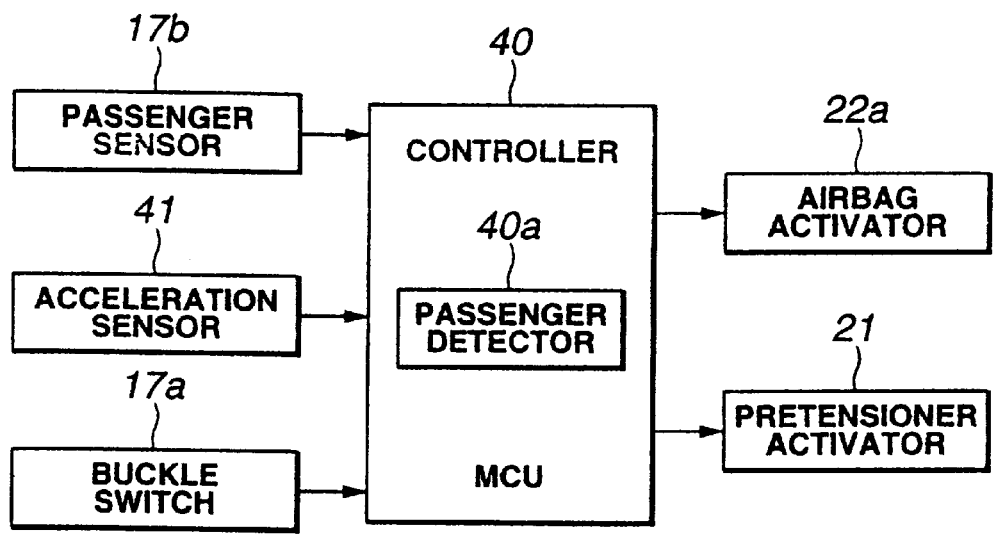
FIG. 6 is a block diagram explaining another control system of the seatbelt device.

FIG. 6 is a block diagram explaining an example of another control operation of the passenger detector 40a of the controller 40. In FIG. 6, the same components as those described in FIG. 4 are given the same reference numerals and the detailed explanation thereof is omitted. In this example, the activation of the seatbelt device is controlled by further referring to the webbing fastening signals of the buckle switch (buckle sensor) 17a.

Figure 7:
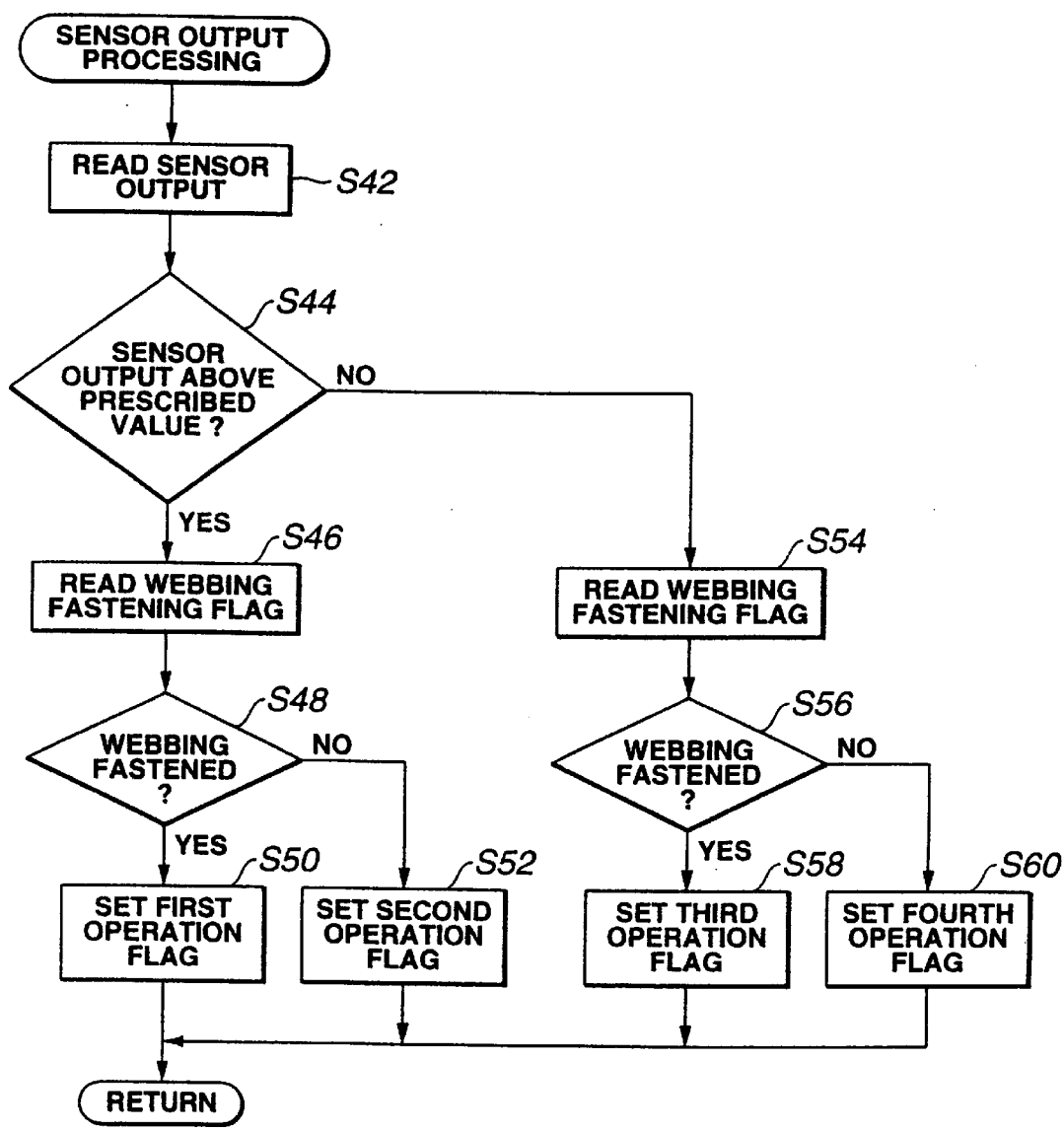

FIG. 7 shows the control algorithm of the passenger detector 40a of the controller 40 in the aforementioned case.

Foremost, the output voltage of the passenger sensor 17b is made into data via the interface when the engine is turned on or per prescribed cycle, such data is written in a prescribed area of the RAM pursuant to the DMA operation, and the interruption flag is set to "on." The webbing fastening signals are also periodically sampled in a similar manner via the interface, such data is written in another prescribed area of the RAM pursuant to the DMA operation, and the webbing fastening flag is set to "on" or "off" in correspondence with the fastened or unfastened state of the webbing 15.

The CPU begins the passenger sensor output processing pursuant to the interruption processing. The CPU then reads the output of the passenger sensor 17b from the prescribed area of the RAM (S42) and distinguishes whether the sensor output is higher than the prescribed value set in advance as the threshold (S44). When the output is higher than the prescribed value (S44; Yes), the CPU determines that a passenger is existent (sitting). The CPU then reads the on/off of the webbing fastening flag (S46) and distinguishes the on/off of the webbing fastening flag (S48) When the webbing is fastened (fastening flag "on") (S48; Yes), the CPU sets the first operation flag to "on."

The "on" state of the first operation flag representing that a passenger is sitting in the seat and has fastened the webbing permits the activation, for example, of both the airbag 22 and the presentioner when a collision is judged upon the comparison between the output level of the acceleration sensor 41 and the standard threshold. The airbag activation threshold is set to a normal value and the activation timing thereof is set to a normal value. The pretensioner activation threshold is set to a normal value and the activation timing thereof is also set to a normal value (S50). The airbag activation threshold and the pretensioner activation threshold pursuant to the output level of the acceleration sensor 41 may be set separately. The CPU then resets the interruption flags and the like which have been processed and returns to the original processing.

When a passenger is existent (S44; Yes) but the webbing has not yet been fastened (S48; No), the CPU sets the second operation flag to "on."

The "on" state of the second operation flag (second operation mode), for example, permits the controller 40 to activate the airbag 22 but does not permit the activation of the pretensioner. The airbag activation threshold is made lower than the normal value and the activation timing is made faster than the normal value. The reason for this is that although the passenger is sitting in the seat, he/she is not wearing the webbing 15. As the only device for protecting the passenger is the airbag 22, the threshold of the airbag 2s is lowered in order to make the activation easier. In comparison to a case in which a passenger is wearing the webbing 15, the movement of the passenger upon collision impact will occur quicker and, thus, the activation timing is also made faster. The pretensioner is not activated. As the passenger is not wearing the webbing, the effectiveness of the pretensioner cannot be expected, and repair costs will be incurred if activated (S52). The CPU then resets the interruption flags and the like which have been processed and returns to the original processing.

When the passenger sensor output is less than a prescribed value and a passenger does not exist (S44; No), the CPU then distinguishes the on/off of the webbing fastening flag (S56). When a passenger does not exists but the webbing is fastened (S56; Yes), the third operation flag is set to "on."

The "on" state of the third operation flag (third operation mode), for example, does not permit the controller to activate the airbag but permits the activation of the pretensioner. The pretensioner activation threshold is set to a normal value, and the activation timing thereof is set to a normal value. The reason for this is that as no passenger is sitting in the seat but the webbing is fastened, there may be cases where objects such as a child seat are secured by such webbing. Here, it is desirable to prevent the child seat from moving pursuant to the inflation of the airbag upon the activation of such airbag (S58). The CPU then resets the interruption flags and the like which have been processed and returns to the original processing.

When the passenger sensor output is less than a prescribed value and a passenger does not exist (S44; No), and when the webbing has not been fastened (S56; No), the fourth operation flag is set to "on."

The "on" state of the fourth operation flag (fourth operation mode), for example, does not permit the controller 40 to activate the airbag or the activation of the pretensioner. When no passenger or object to be protected exists in the seat, there is no benefit in activating the airbag or pretensioner. Rather, it is desirable to avoid the repair thereof after the activation of such protection devices.

Accordingly, the seatbelt device of the present invention has a sensor built in the buckle for detecting the existence of a passenger and, therefore, is positioned in the vicinity of the passenger and is not influenced by the movement or reclining of the seat. Thus, the existence of a passenger is detected with certainty, and it is further possible to control with certainty the passenger safety device or passenger protection device pertaining to the seatbelt device.

Other than the infrared (thermal) sensor used in this embodiment, the passenger sensor 17b may be a supersonic sensor, laser (or optical) sensor, and so forth.

Next, structural examples of the buckle sensor for detecting the fastening of the webbing 15 are explained below. The aforementioned buckle sensor 17a may be structured of a mechanical switch. In the example explained below, used as the buckle sensor mentioned above is a sensor having non-contact operation and a malfunction diagnosis function in order to improve the reliability thereof.

Figure 8:
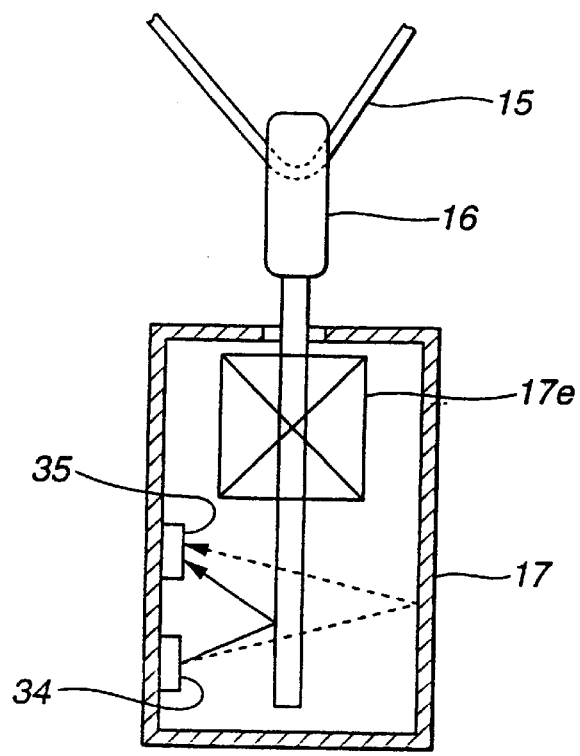
FIG. 8 is a diagram explaining an example of a sensor for detecting the fastening of a webbing pursuant to supersonic waves.

FIG. 8 shows an outline of an example using a supersonic sensor as the non-contact sensor. In FIG. 8, the tongue plate 16 to which the webbing 15 passes through is inserted into the buckle 17 and is locked by the engagement (or connective) mechanism 17e. A wave transmitter 34 and a wave receiver 35 for structuring the pickup portion of the supersonic sensor are provided to the inner wall of the buckle 17. In the state where the tongue plate 16 is not inserted into the buckle 17 (webbing is not fastened), the supersonic wave (shown with dotted lines in the diagram) emitted from the wave transmitter 34 is reflected on the opposite inner wall of the buckle 17 and is returned to the wave receiver 35. Therefore, the length of the propagation path of the supersonic wave differs depending upon the fastened or unfastened state of the webbing 15.

Figure 9:
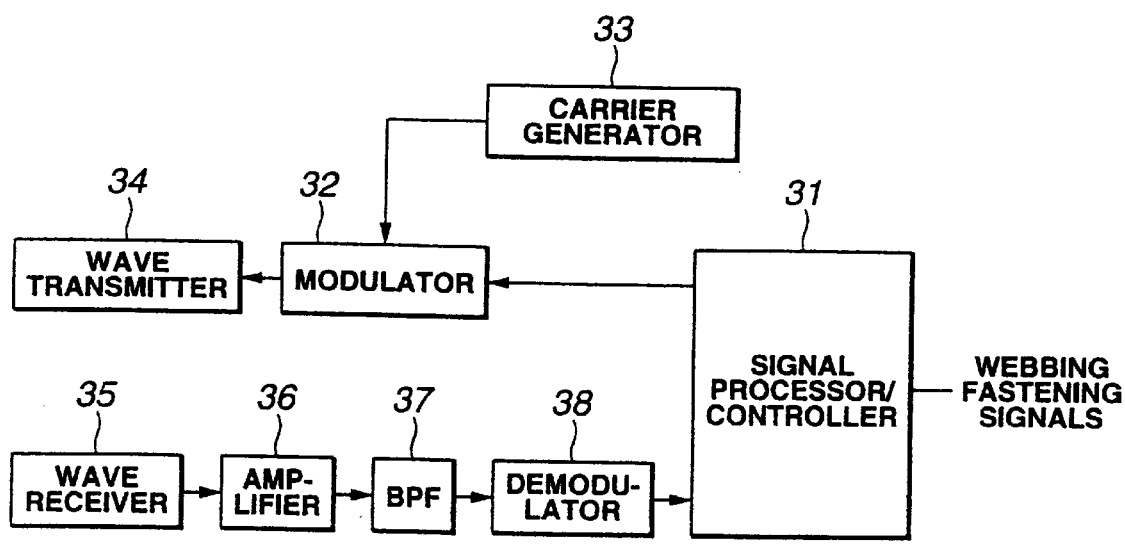
FIG. 9 is a diagram explaining the signal processing system upon using a supersonic sensor.

FIG. 9 is a block diagram showing the control system of the buckle sensor using the aforementioned supersonic sensor. FIG. 10 is a diagram explaining the signals in such control system.

Signal processor/controller 31 is structured, for example, with a microcomputer system and supplies to the modulator 32 pattern signals having continuous pulses in a fixed cycle as shown in FIG. 10(a). The modulator 32 modulates 100 KHz carrier signals supplied, for example, from the carrier generator 33 pursuant to pattern signals and forms modulation signals in which the 100 KHz carrier pulses are intermittent as shown in FIG. 10(b). These modulated signals are provided to the wave transmitter 34 and converted into intermittent supersonic signals. Supersonic signals emitted from the wave transmitter 34 are reflected on the inner wall of the tongue plate 16 or the buckle 17 and returned to the wave receiver 35. Supersonic signals are converted into electronic signals by the wave receiver 35, level amplified by the amplifier 36, and further, for example, noises are eliminated by the band pass filter 37 having a central frequency of 100 KHz. These reception signals are supplied to the demodulator 38, the levels thereof are detected, and such reception signals are demodulated to original pattern signals and supplied to the signal processor/controller 31. The respective demodulation signals are shown in FIG. 10(c) for a case when the tongue plate 16 is engaged, and in FIG. 10 (d) for a case when the tongue plate 16 is not engaged.

After transmitting the pattern signals, the signal processor/controller 31 determines whether the time Δ tn until receiving the reflection signal is under the prescribed time Δ ts set in advance. The signal processor/controller 31 further distinguishes whether the transmission pattern and the reception pattern of the pattern signals coincide. When the respective patterns of the transmission/reception signals coincide and the response time Δ tn is under a first prescribed range, 40 to 70 μs for example, the tongue plate 16 is judged as being in a connected state (webbing is fastened). Moreover, when the respective patterns of the transmission/reception signals coincide and the response time Δ tn is under a second prescribed time, 100 to 140 μs for example, the tongue plate is judged as being in a non-connected state (webbing is not fastened). The signal processor/controller 31 sends webbing fastening signals showing the fastened or unfastened state of the webbing to the computer system of the controller 40, and sets flags showing the fastened or unfastened state of the webbing in the RAM flag area (or the condition register) thereof.

When the patterns of the transmission/reception signals do not coincide or when the response time is not under the prescribed range, the signal processor/controller 31 further judges that this is due to the influence of disturbance noise and transmits pattern signals once again to perform the detection operation. If reception signals cannot be obtained even upon transmitting pattern signals, the signal processor/controller 31 determines that the webbing fastening detector is defective, and displays a warning of the malfunction of the buckle sensor (webbing fastening detector) to the console panel or the maintenance indicator of the vehicle.

Figure 12:
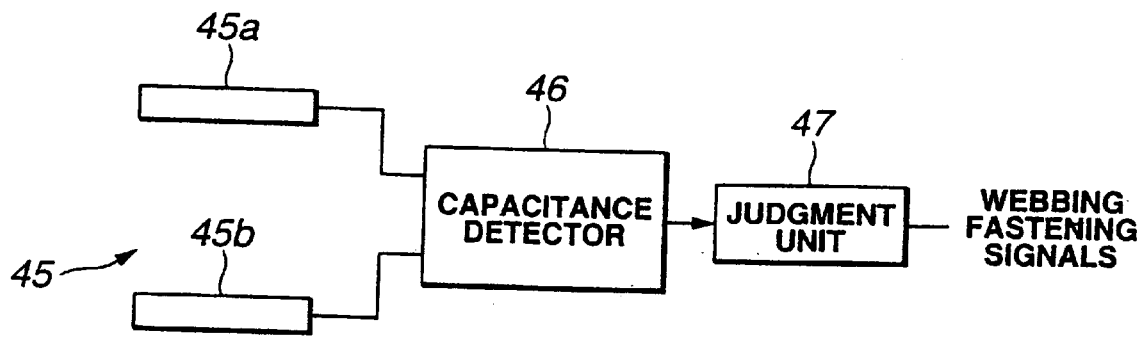
FIG. 12 is a diagram explaining the signal processing system upon using a capacitance sensor.
Figure 13:
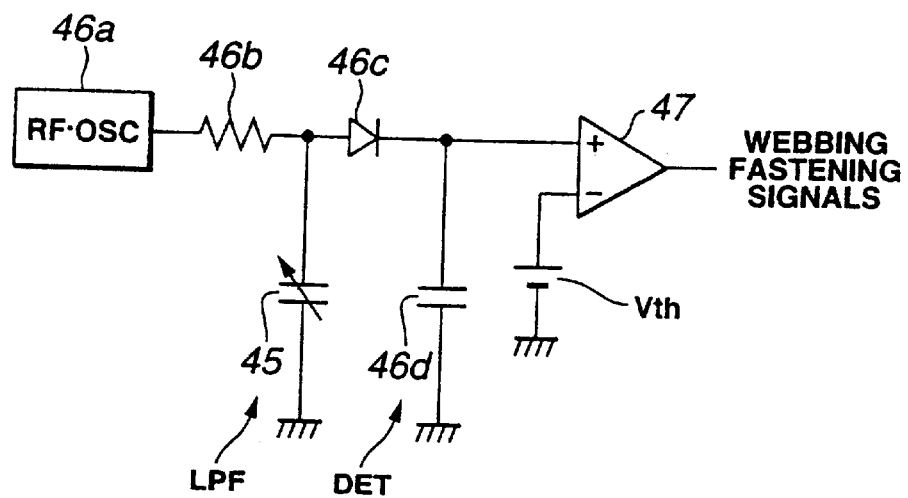
FIG. 13 is a circuit diagram explaining a structural example of the capacitance detector 42.

FIGS. 11 through 13 are diagrams explaining examples of using a capacitance sensor as the non-contact sensor.

FIG. 11 shows an example of a capacitance sensor provided inside the buckle 17. The tongue plate 16 to which the webbing 15 passes through is locked by the stopper mechanism (or connective mechanism) 17e upon being inserted into the buckle 17. A laminar electrode 45a is arranged on one wall of the inside of the buckle 17 via an insulator not shown. The electrodes 45a and 45b are facing each other, and structure the capacitor 45. When the tongue plate is not inserted into the buckle 17 (webbing is not fastened), the electrodes 45a and 45b structure a first capacitor. When the tongue plate is inserted into the buckle 17 (webbing is fastened), the electrode 45a and the tongue plate 16, and the tongue plate 16 and the electrode 45b structure a second capacitor. Therefore, the judgment of the fastened or unfastened state of the webbing is realized by the distinction of the capacity of the capacitor.

FIG. 12 shows a structural example of a device for distinguishing the capacity of the capacitor 45. The capacitance detector 46 generates output in accordance with the capacity between the electrodes 45a and 45b. By distinguishing this output with the judgment unit 47, the fastened or unfastened state of the webbing is determined, webbing fastening signals are output, and a flag showing the fastened or unfastened state of the webbing is set in the flag area (or condition register) of the RAM of the controller 40 computer system.

FIG. 13 shows a structural example of the capacitor detector 46. In this example, changes in the capacitance are detected as the changes in the cutoff frequency of the low-pass filter.

In FIG. 13, the low-pass filter (LPF) is structured from a resist 46b, and a variable capacitor 45 formed with electrodes 45a and 45b. Provided to this low-pass filter are high frequency signals of frequency fo in the vicinity of the cutoff frequency from the high frequency oscillator 46a. The low-pass filter output is converted into level signals by the level detector (DET) formed with a diode 46c and a capacitor 46d, and provided to the level comparator 47 as the judgment unit. A predetermined standard voltage Vth is supplied to the comparative standard input of the level comparator 47.

When the tongue plate 16 is inserted between both electrodes and the capacity of the capacitor 45 is increased, the cutoff frequency lowers, and the low-pass filter considerably decreases the level of passing high frequency signals. Further, when the capacity of the capacitor 45 decreases, the cutoff frequency rises and the low-pass filter lowers the level decrease of the passing high frequency signals. If the comparative standard voltage Vth is set to the intermediate value of the two outputs of the level detector, namely, when the tongue plate 16 is inserted into the buckle 17 and when it is not, webbing fastening signals showing the fastened or unfastened state of the webbing may be obtained in the output of the level comparator 47.

Figure 14:
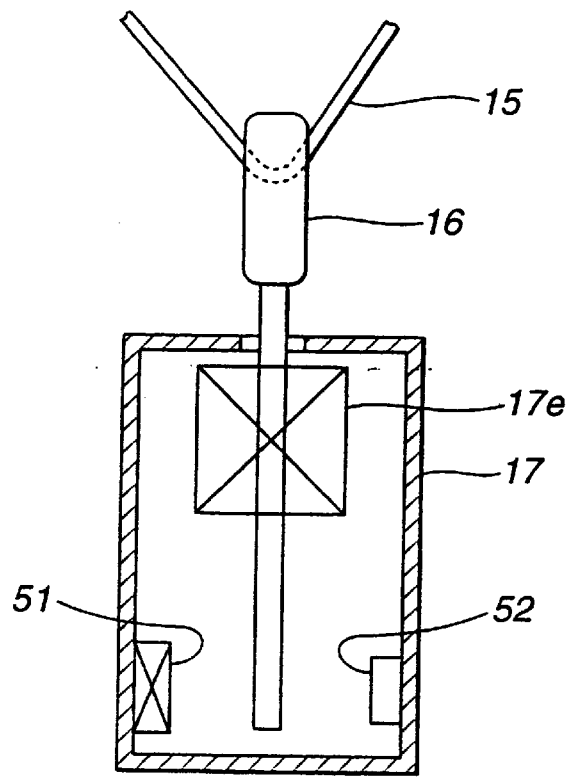
FIG. 14 is a diagram explaining an example of a sensor for detecting the fastening of a webbing pursuant to magnetism.
Figure 15:
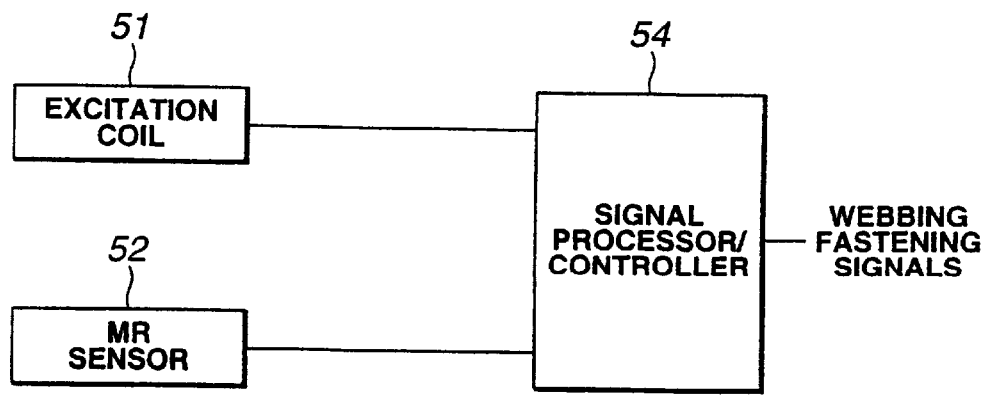
FIG. 15 is a diagram explaining the signal processing system upon using a magnetic sensor.

FIGS. 14 through 16 are diagrams explaining the examples of the magnetic sensor as the non-contact sensor.

FIG. 14 shows an example of a magnetic sensor provided inside the buckle 17. The tongue plate 16 to which the webbing 15 passes through is locked by the stopper mechanism (or connective mechanism) 17e upon being inserted into the buckle 17. An excitation coil (or electromagnet) is internally provided to one wall of the buckle 17 and a magnetic sensor 52 is internally arranged on the other wall thereof. The magnetic sensor 52 shows the resist value in accordance with the strength of the surrounding magnetic field. When the tongue plate 16, which is a magnetic body, is inserted between the excitation coil 51 and the magnetic sensor 52, the tongue plate becomes a kind of magnetic shield and decreases the influence of the magnetic field from the magnetic sensor 52 to the excitation coil 51. Therefore, the judgment of the fastened or unfastened state of the webbing may be distinguished with the output level of the magnetic sensor 52.

Figure 16A:
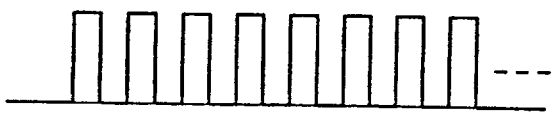
FIGS. 16a, 16b, and 16c is a diagram explaining a signal waveform example in the signal processing system shown in FIG. 15.

FIGS. 15 and 16 show structural examples of the control system of the buckle sensor (webbing fastening detector) pursuant to the magnetic sensor. In these diagrams, the signal processor/controller 54 supplies an excitation current in intermittent patterns to the excitation coil 51 and, as shown in FIG. 16(a), generates an intermittent magnetic field. The signal processor/controller 54 is structured of a microcomputer system. When the tongue plate 16 is not inserted into the buckle 17, the output of the magnetic sensor 52 is considerably large, and exceeds the distinction standard voltage Vth. When the tongue plate 16 is inserted into the buckle 17, the radiation of the magnetic field of the excitation coil 51 is obstructed with the tongue plate 16. The output of the magnetic sensor 52 thereby becomes considerably large and falls below the distinction standard voltage Vth. The output of the magnetic sensor 52 is A/D converted by the interface not shown of the signal processor/controller 54 and written in the flag area (or condition register) of the RAM of the controller 40 pursuant to a DMA operation.

Figure 16B:
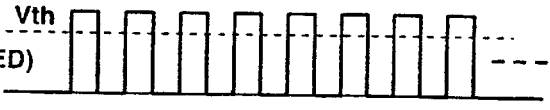
Figure 16C:
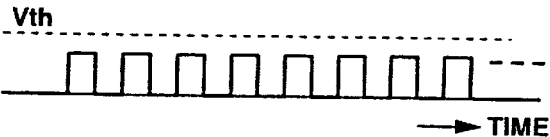

When an excitation current is provided to the excitation coil 51 and the output of the magnetic sensor 52 exceeds the distinction value Vth as shown in FIG. 16(b), the signal processor/controller 54 judges that the webbing is not fastened. Next, webbing signals are disengaged or the webbing fastening flag of the flag area (or condition register) is reset. When the output of the magnetic sensor 52 does not exceed the distinction value Vth as shown in FIG. 16(c), the signal processor/controller 54 judges that the webbing is fastened. The signal processor/controller 54 further supplies to the ice controller 40 webbing fastening signals representing the fastened or unfastened state of the webbing and sets a webbing fastening flag showing the fastened or unfastened state of the webbing to the flag area (or condition register) of the RAM thereof.

Moreover, when the signal processor/controller 54 provides an excitation current to the excitation coil 51 but cannot obtain an output from the magnetic sensor 52, or when it detects a high level of irregularity, the signal processor/controller 54 judges that the buckle sensor (webbing fastening detector) is defective, and indicates an irregularity warning on the console panel of the vehicle via the controller 40. When the excitation current pattern to the excitation coil 51 and the magnetic sensor output pattern do not coincide, or when the response time of the magnetic sensor to the excitation current supply is not within a prescribed range, the signal processor/controller 54 determines the infection of disturbance and performs detection once again.

Further, a non-contact buckle sensor may similarly be structured using a luminescent diode and phototransistor instead of the excitation coil 51 and the magnetic sensor 51, respectively.

Figure 17:
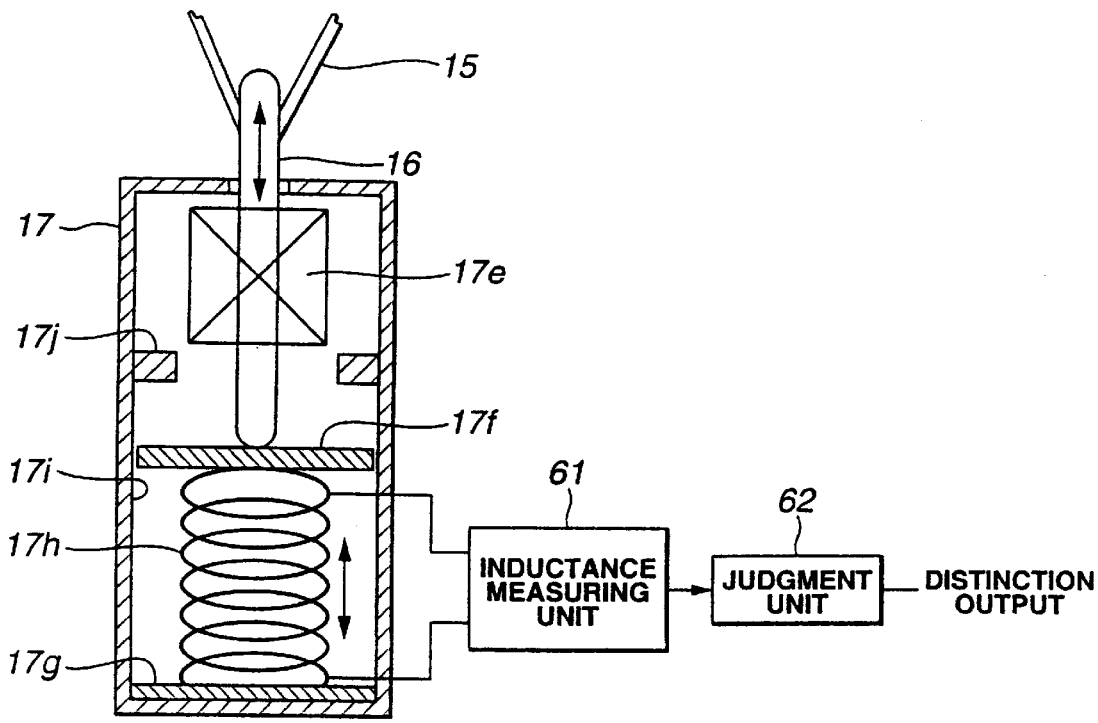
FIG. 17 is a diagram explaining a sensor for detecting the fastening of a webbing pursuant to inductance changes.

FIG. 17 is a diagram explaining an example of a buckle sensor utilizing the inductance changes of the coil spring which urges the tongue plate 16.

In this diagram, arranged internally within the buckle 17 is a coil spring 17h sandwiched between an upper insulation plate 17f and a lower insulation plate 17g. Insulation processing has been performed on the coil spring 7h such that it urges the upper insulation plate 17f upward. The lower insulation plate 17g is in contact with the end of the tongue plate 16 and moves upward/downward while being guided by the cylinder inner wall 17i pursuant to the insertion/removal of the tongue plate 16, and expands/contracts the coil spring 17h. The upper insulation plate 17f is urged upward with the coil spring 17h and the uppermost position thereof is the bottom end face of the stopper 17j provided to the inner wall of the cylinder. A stopper mechanism (connective mechanism) 17e is provided to the upper part of the stopper 17j.

When the tongue plate 16 to which the webbing passes through is inserted into a prescribed position by the passenger, the stopper mechanism 17e engages with the tongue plate 16 and is locked such that it does not disengage with the buckle 17. This lock is released by pushing a prescribed position (release button) of the buckle 17. When the lock is released, the tongue plate 16 is extruded outward by the urging force of the coil spring 17h.

When the tongue plate 16 is inserted into the stopper mechanism 17e, the tip of the tongue plate 16 contacts the upper face of the upper insulation 17f and the upper insulation plate 17f is urged downward until the a position in which the tongue plate 16 is locked. Here, the coil spring 17h becomes the minimum length, the number of turns (winding density) per unit length becomes large, and the inductance becomes a large value Lm. When the webbing is unfastened, the tongue plate 16 extends to the stopper 17j of the connective mechanism 17e and the coil becomes a maximum length, the number of turns (winding density) per unit length becomes small, and the inductance becomes a small value Lo.

The respective terminals of both ends of the coil spring 8h are connected to the inductance measuring unit 31. The inductance measuring unit 31 measures the inductance of the coil spring 17h and provides the measured value to the judgment unit 62. The judgment unit 62 determines the connection/non-connection of the tongue plate from the inductance value pursuant to the correspondence between the inductance value Lm to Lo and the extension of the coil spring, and outputs to the controller 40 signals showing the fastened or unfastened state of the webbing. When the judgment unit 62 detects an inductance value outside the range of inductance value Lm to Lo, it judges that some type of irregularity, such as the coil being broken, has occurred to the buckle. In such case, the controller 40 notifies a warning of a buckle irregularity to the warning indicator panel of the vehicle console not shown.

Figure 18:
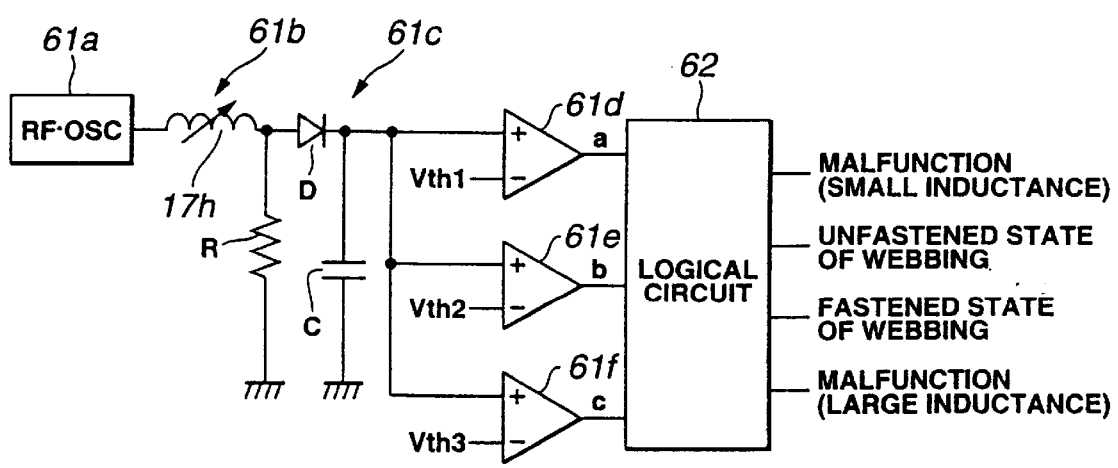
FIG. 18 is a block circuit diagram explaining the structural system of the inductance measuring unit 31 and judgment unit 32.

FIG. 18 is a block circuit diagram showing a structural example of the inductance measuring unit 61 and the judgment unit 62. The coil spring 17h and the resist R structure the low-pass filter 61b. A high frequency signal fo is supplied to the input end of the low-pass filter from the high frequency oscillator 61a. Pursuant to the change in the inductance of the coil spring 17h, as explained later, the high cutoff frequency of the low-pass filter is changed. The output of the low-pass filter 61b, for example, is converted into level signals with the level detector 61c, which is made of a diode D and a capacitor C, and supplied to the respective comparative inputs of level comparators 61d to 61f. Provided to the respective comparison standard inputs of level comparators 61d to 61f are, respectively, comparison standard voltages Vth1, Vth2, and Vth3. The standard voltage is set to Vth1>Vth2>Vth3.

Figures 19, 20:
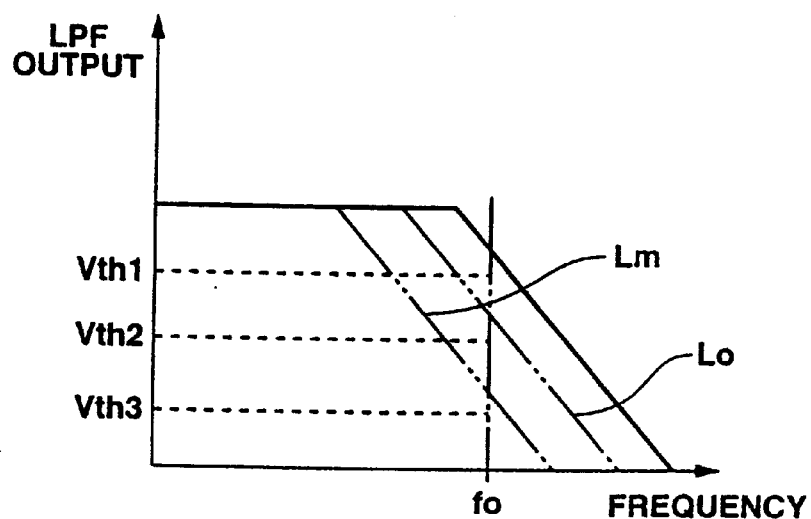
FIG. 19 is a diagram explaining the changes in the properties of the low-pass filter 31b pursuant to inductance changes.
FIG. 20 is a diagram explaining the input/output properties of the logical circuit.

FIG. 19 is a graph explaining the examples of properties of the low-pass filter 61b. When the coil spring 17h is contracted, the high cutoff frequency is lowered as the inductance is large, and the output of the low-pass filter 61b is considerably decreased in high frequencies. Contrarily, when the coil spring 17h is extended, the cutoff frequency is raised as the inductance is small, and the output of the low-pass filter 61b is increased in high frequencies. The frequency property Lm shown in the diagram represents a high attenuation property example when the tongue plate 16 is connected to the buckle 17. Moreover, Lo represents a high attenuation property example when the tongue plate 16 is disengaged from the buckle 17. Then, appropriate thresholds Vth1 to Vth3 are set to level comparators 61d to 61f. With thresholds Vth3 or higher, the measured inductance is larger than the scheduled inductance range, and is irregular. Thresholds Vth2 to Vth3 are within the inductance range of the fastened state of the webbing. Thresholds Vth1 to Vth2 are within the inductance range of the unfastened state of the webbing. With thresholds lower than Vth1, the measured inductance is smaller than the scheduled inductance range, and is irregular.

FIG. 20 is a diagram explaining the operation of the logical circuit (judgment unit) 62. The logical circuit 62 is structured in combination with the logical gate. The logical circuit 62 outputs concerning the malfunction (small inductance), fastened or unfastened state of the webbing, and malfunction (large inductance) in correspondence with the respective combinations of "L" and "H" of outputs a to c of level comparators 61d to 61f. These outputs are set to the flag area (or condition register) of the controller 40 RAM as a webbing fastening flag, sensor malfunction flag, etc.

Figure 21:
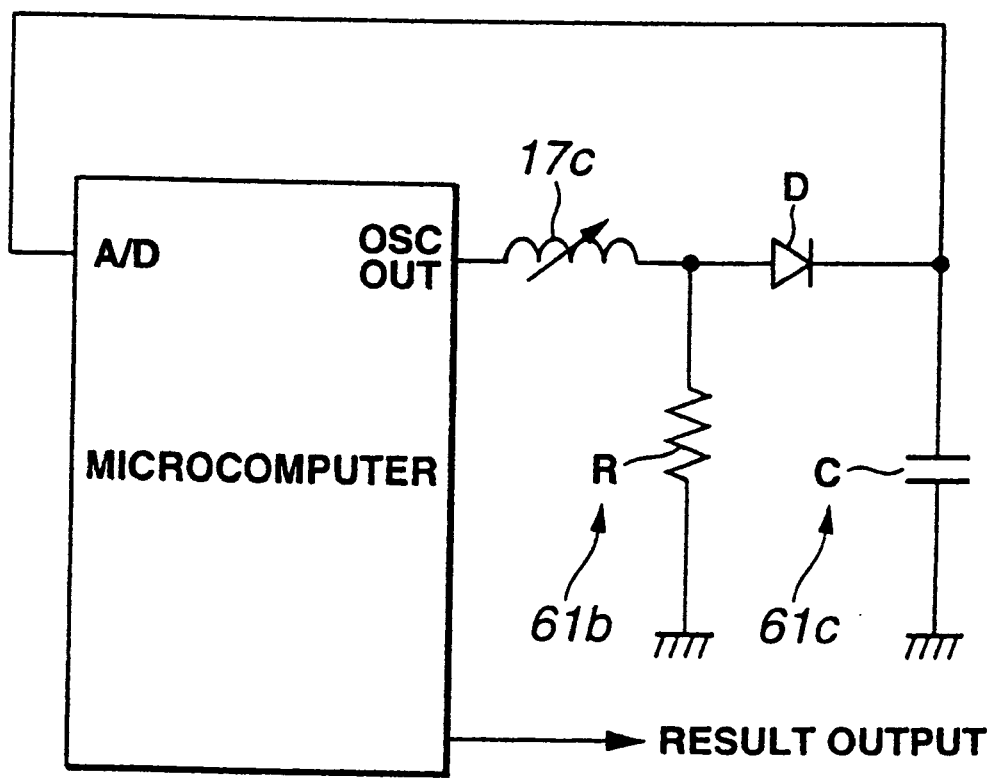
FIG. 21 is a diagram explaining an example of a high frequency oscillator 31a, comparator 31d, and logical circuit structured with a microcomputer.

The inductance measuring unit 61 and the judgement unit 62, as shown in FIG. 21, may be structured of a microcomputer. The output of the oscillator having a built-in microcomputer is provided to the low-pass filter, which is composed of a coil spring 17h and resist R, and the level detector 61 composed of a diode D and capacitor C detects such output and makes this into digital data with its built-in A/D converter. The value of this sampling data is distinguished with the judgment program, and the judgment result is output as shown in FIG. 20. The aforementioned coil spring 17h, inductance measuring unit 61, and judgment unit 62 are engagement detection elements as well as malfunction detection elements.

In the embodiment described above, although the inductance measuring unit 61 is structured to obtain an output in correspondence with the inductance in view of the high cutoff property of the low-pass filter changing pursuant to the inductance change, it is not limited thereto. For example, the inductance measuring unit 61 may be structured to detect changes in the frequency band level property pursuant to changes in the resonant frequencies of the resonant circuit including a variable inductance (17h) and a capacitor, inductance values utilizing Q property changes of the LC circuit or the tank circuit, or the changes in the inductance. Moreover, changes in the oscillation frequencies of the oscillation circuit including a variable inductance (17h) and a capacitor may be detected as frequency-to-voltage conversion (F–V conversion).

Accordingly, the aforementioned buckle sensor (webbing fastening detector) detects, with an electric parameter, the expansion/contraction of the coil spring arranged inside the buckle pursuant to the fastening of a webbing. Thus, other than being able to detect the fastened or unfastened state of the webbing pursuant to parameter values, irregularities of the buckle sensor may also be detected, which is convenient.

Figure 22:
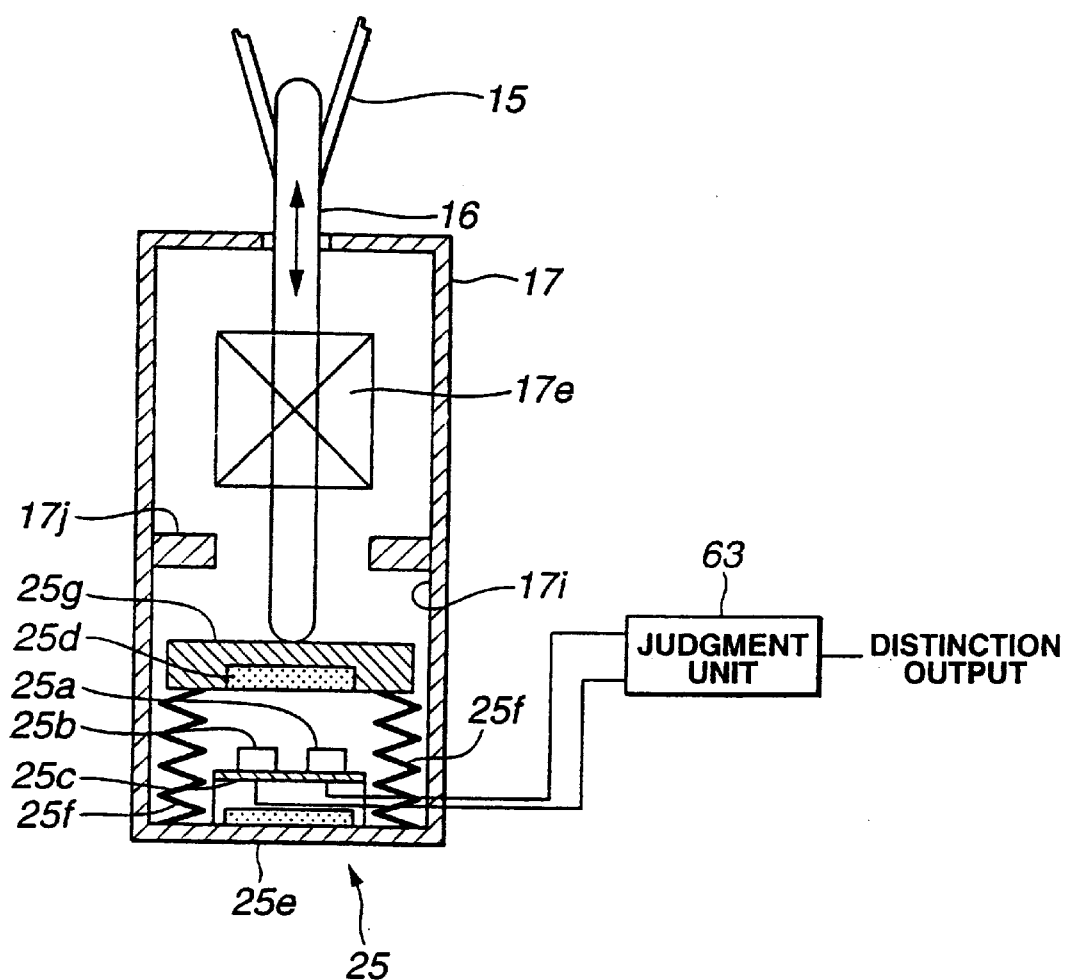
FIG. 22 is a diagram explaining an example of detecting the fastening of a webbing pursuant to the magnetic sensor of complementary output.

FIG. 22 shows an example of a magnetic sensor which generates complementary output being used as the buckle sensor.

In this diagram, a stopper (connection) mechanism 17e internally provided to the buckle 17. When the tongue plate 16 is inserted into a prescribed position of the buckle 17 by the passenger, the stopper mechanism 17e engages with the tongue plate 16 and is locked (connected) such that it does not disengage therefrom. This lock is released when a prescribed position (release button) of the buckle 16 is pushed (not shown). When the tongue plate is inserted into the stopper mechanism 17e, the tip of the tongue plate 16 contacts the upper face of the separator 25g, and the separator 25g is pushed downward to a position until the tongue plate is locked. When the lock is released, the tongue plate is extruded outward from the buckle with the urging element 25f which presses the separator 25g upward.

The separator 25g is guided by the buckle inner wall 17i and is movably arranged in the upward/downward direction of the diagram. The urging element 25f pushes the lower part of this separator 25g upward. A coil spring may be used as the urging element, for example. Desirable is a coil spring that does not influence the magnetic field, and preferably a non-magnetic body. This urging element may also be a plate spring, bamboo spring, rubber, synthetic rubber, damper, etc. The separator 25g rises due to the urge of the coil spring 25f. The uppermost position thereof is the lower face of the stopper 17j provided to the buckle inner wall. The separator 25e is pushed downward by the tongue plate 16 tip, which hits against the approximate center of such separator, inserted into the buckle. The webbing 15 is inserted into the tongue plate 16.

A first permanent magnet 25d is provided to the center of the lower part of the separator 25e. The permanent magnet 25d moves upward/downward in connection with the movement of the tongue plate 16 together and in accordance with the movement of the separator 25e. First and second magnetic sensors 25a and 25b are arranged on the buckle inner wall side facing this permanent magnet 25d. As the magnetic sensor, used may be, for example, a hall IC utilizing the hall effect or an MRIC utilizing the magnetic resist. Magnetic sensors 25a and 25b are mounted on the upper face of the non-magnetic body insulation substrate 25c. A second permanent magnet 25e is arranged on the lower face of the insulation substrate 25c. A type of bias magnetic field is provided to the magnetic sensors 25a and 25b from the backside, and makes the magnetic sensors generate either the "H" or "L" output. The intensity of this magnetic field (magnetic flux density) is adjustable pursuant to the intensity of the magnetic force of the permanent magnet 25e, distance from the magnetic sensors 25a and 25b, and so on. The intensity of the magnetic field in the vicinity of the magnetic sensors 25a and 25b pursuant to the permanent magnet 25e is set to be lower than the intensity of the magnetic field formed by the permanent magnet 25d in the vicinity of the magnetic sensors 25a and 25b when the tongue plate 16 engages (or connects) with the buckle 17 and therefor approaches the magnetic sensors 25a and 25b. In other words, when the permanent magnet 25d approaches the magnetic sensors 25a and 25b, the magnetic field of the permanent magnet 25d is killed, magnetic sensors 25a and 25b are controlled by the magnetic field formed by the permanent magnet 25d, and the magnetic sensors 25a and 25b generate either the "H" or "L" output. Here, in order to simplify the irregularity judgment or malfunction judgment, it is preferable that the outputs of magnetic sensors 25a and 25b are complementary to each other. For example, it is possible to obtain complementary outputs by utilizing reverse outputs (via an inverter) or appropriately selecting the direction of the magnetic sensor against the direction of the magnetic line of force. Outputs of magnetic sensors 25a and 25b are supplied to the judgment unit 63.

Figures 23, 24:
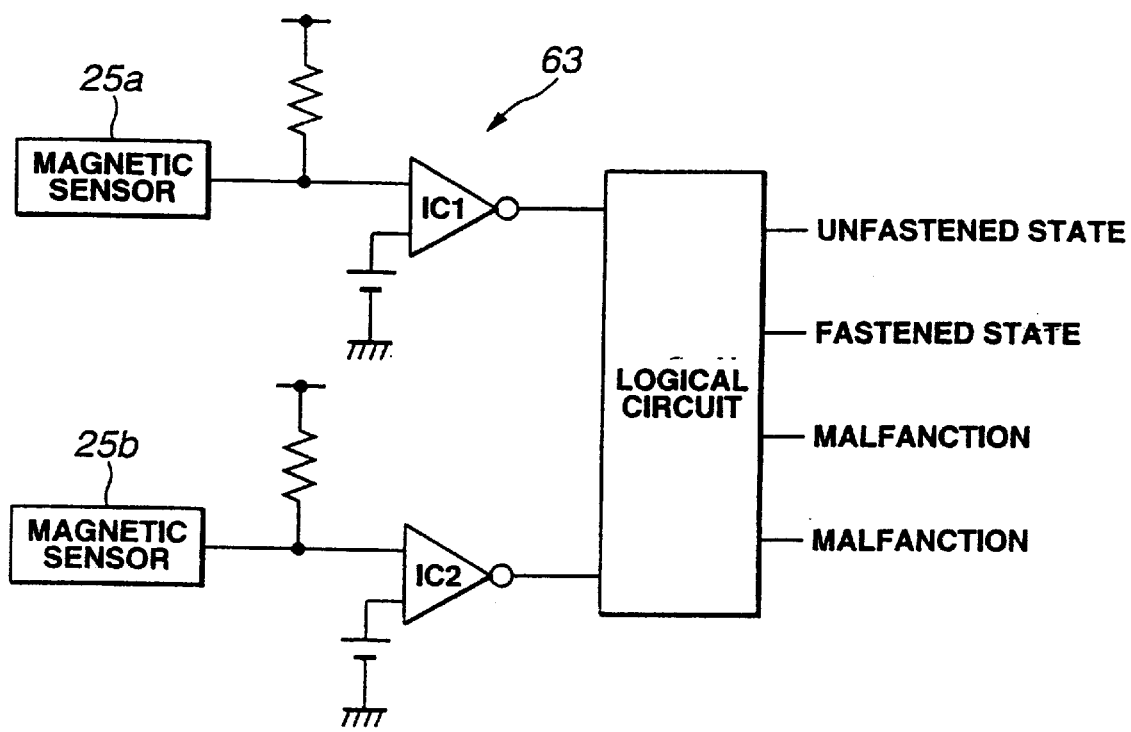
FIG. 23 is a diagram explaining the structure of the judgment unit 33.
FIG. 24 is a diagram explaining the operation of the judgment unit 33.

FIGS. 23 and 24 are diagrams respectively explaining the structure and operation of the judgment unit 63. The judgment unit 63 is structured of a logical circuit or a microcomputer. The respective outputs of the magnetic sensors 25a and 25b are respectively made into two values by the level comparators IC1 and IC2.

FIG. 24 shows the respective outputs of IC1 and IC2 in correspondence with the respective outputs of the magnetic sensors 25a and 25b, and the judgment results of the judgment unit 63 to such outputs. Magnetic sensors 25a and 25b, substrate 25c, permanent magnets 25d and 25e, and judgment unit 63 are stopper detection devices as well as malfunction detection devices.

When the tongue plate 16 and the buckle 17 are not engaged, the magnetic field of the permanent magnet 25e is provided to both magnetic sensors and complementary outputs "H" and "L" are generated. In correspondence thereto, the judgment unit 63 judges "non-engagement" and generates signals showing such "non-engagement." When the tongue plate 16 and the buckle 17 are engaged, the magnetic field of the permanent magnet 25e is provided to both magnetic sensors and the complementary outputs "H" and "L" are generated. In correspondence thereto, the judgment unit 63 judges "engagement" and generates signals showing such "engagement." Moreover, when the IC1 output and IC2 output are "H" and "H" or "L" and "L," as these outputs are not expected, the judgment unit 63 determines that there is an "irregularity" or "malfunction" and generates signals showing such irregularity (or malfunction). Information on the fastened or unfastened state of the webbing and the malfunction of the webbing fastening detector is provided to a seatbelt device or a mounted computer comprising a function of automatically adjusting the fastening of the webbing.

According to the aforementioned structure, for example, when the webbing is fastened, as shown in FIG. 7, the first magnetic sensor 25a becomes an "L" output and the second magnetic sensor 25b becomes an "H" output. Moreover, the opposite can be said when the webbing is not fastened, and the first magnetic sensor 25a becomes an "H" output and the second magnetic sensor 25b becomes an "L" output. The fastened or unfastened state of the webbing is thereby distinguished.

When either of the magnetic sensors is defective, for example, if magnetic sensor 25a is defective when the webbing is fastened (when magnetic sensors 25a and 25b are "L" and "H") and is constantly an "L" output, the combination of the first and second magnetic sensors 25a and 25b is maintained at "L" and "H" and, therefore, the webbing is not judged as being unfastened. Here, if the webbing is temporarily unfastened, outputs of magnetic sensors 25a and 25b become "L" and "L" and will be judged as a malfunction. If magnetic member 25a is defective when the webbing is fastened (when magnetic sensors 25a and 25b are "L" and "H") and is constantly an "H" output, the outputs of magnetic sensors 25a and 25b become "H" and "H" and, therefore, it is immediately judged as a malfunction.

Similarly, if the magnetic sensor 25b is defective when the webbing is fastened (when magnetic sensors 25a and 25b are "L" and "H") and is constantly an "L" output, the combination of the first and second magnetic sensors 25a and 25b is maintained at "L" and "L" and, therefore, it is immediately judged as a malfunction. If the magnetic member 25b is defective when the webbing is fastened and is constantly an "H" output, the webbing is not judged as being unfastened. Once the webbing is unfastened, however, the outputs of magnetic sensors 25a and 25b become "H" and "H" and, therefore, it is immediately judged as a malfunction. The respective outputs of the judgment unit (logical circuit) 63 are supplied to the controller 40 and various flags are set.

Although a magnetic sensor is used in this embodiment, deterioration of the magnetic force of the permanent magnet is possible.

For example, when the magnetic force of a fixed magnet 25e decreases, as this is not within the range of a magnetic field level detectable with a magnetic sensor when the webbing is not fastened, outputs of both sensors will be "H" and "H" and it is thereby judged as a malfunction. When the webbing is fastened, and is unfastened thereafter, outputs of both sensors will be "H" and "H" and it is thereby judged as a malfunction. When the magnetic force of the magnet 25e rises, although undetectable when the webbing is not fastened, when fastened, the magnetic field influence of the magnet 25d is killed by the magnet 25e, the magnet field becomes a low magnetic field for the magnetic sensors and, as the outputs of both sensors are "H" and "H," it is judged as a malfunction.

Furthermore, when the magnetic force of a movable magnet becomes weak, this will result in a similar situation as with the rise in the magnetic force of the aforementioned magnet 25e, and will be judged as a malfunction. When the magnetic force of the magnet 25d rises, this will result in a similar situation as with the weakening of the magnetic force of the aforementioned magnet 25e, and will be judged as a malfunction.

According to the present embodiment, as the fastened or unfastened state of the webbing is detected with a non-mechanical operation using the complementary outputs of two magnetic sensors and a self-diagnosis of a sensor malfunction is further possible, it is preferable in that reliability is increased.

Figure 25:
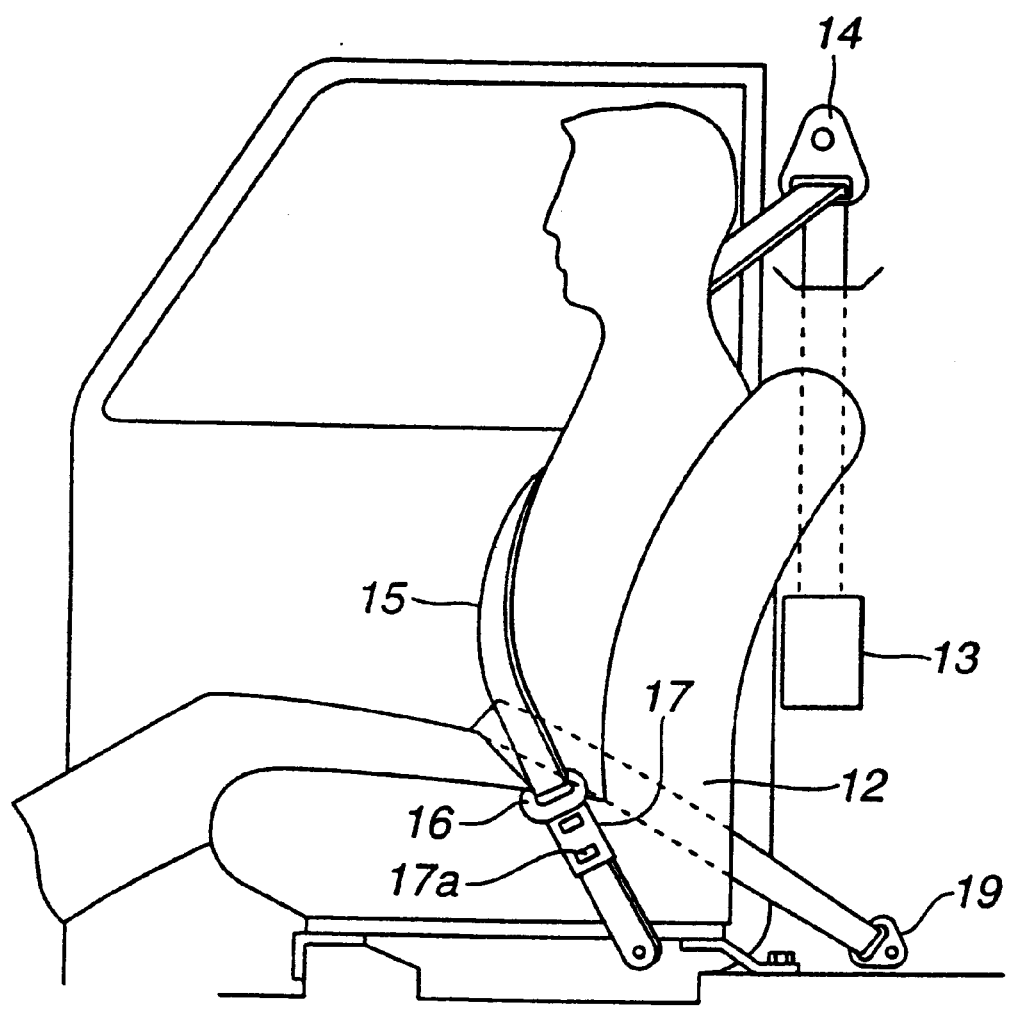
FIG. 25 is a diagram explaining the outline of a seatbelt device comprising only the sensor for detecting the fastening of a webbing.

Further, it is also possible to provide the various buckle sensors independently to the buckle. FIG. 25 shows an outline of the seatbelt device in such a case. After sitting in the seat 12 of the vehicle, the passenger retracts the webbing 15 from the webbing winder 13 mounted on the vehicle wall via the supporter 14. Then, the passenger fastens the webbing 15 by connecting the tongue plate 16 mounted on the webbing 15 with one end of the buckle 17. The other end of the buckle 17 is mounted on the seat side vehicle floor or the lower part of the seat via a mounting member such as a belt. A sensor 17a for detecting the fastened or unfastened state of the webbing is internally provided to the buckle 17. The tip of the webbing 15 is mounted to the lower part of the vehicle wall with the anchor plate 19. As the sensor 17a, used may be, for example, the aforementioned non-contact sensor or a sensor capable of self-diagnosing its malfunction in order to provide a highly reliable buckle sensor.

What is claimed is:

1. A seatbelt device for securing a passenger to a seat with a webbing, comprising:
   a tongue plate mounted on said webbing;
   a buckle which engages with said tongue plate and fastens said webbing to the passenger; and
   a passenger detector for detecting the existence of said passenger in said seat;
   wherein said passenger detector is provided inside said buckle.

2. A seatbelt device according to claim 1, wherein said buckle is positioned at the side of the sitting passenger and supported in a position such that said passenger detector is capable of detecting the passenger.

3. A seatbelt device according to claim 1, wherein said passenger detector is provided on the side of said buckle facing said passenger.

4. A seatbelt device according to claim 3, wherein said passenger detector includes an infrared sensor for detecting infrared rays emitted from said passenger.

5. A seatbelt device according to claim 3, wherein said passenger detector includes a sensor which discharges electromagnetic waves containing supersonic waves or light and detects the existence of a passenger pursuant to the reflective waves reflected by said passenger.

6. A seatbelt device according to claim 1, wherein a webbing fastening detector for detecting the engagement of said tongue plate and said buckle is further provided inside said buckle.

7. A seatbelt device according to claim 6, wherein said webbing fastening detector includes:
   a non-contact detector provided inside said buckle and for generating, without contacting said tongue plate, the output corresponding to the existence of said tongue plate in the position where said tongue plate and the stopper mechanism of said buckle should engage; and
   a judgment element for judging the engagement/non-engagement of said tongue plate and said buckle from the output of said non-contact detector.

8. A seatbelt device according to claim 6, wherein said webbing fastening detector includes:
   a first magnet provided inside said buckle and which moves in correspondence with the engagement of said buckle and the stopper mechanism of said buckle;
   a second magnet provided and secured inside said buckle;
   first and second magnetic sensors provided inside said buckle and arranged such that they detect the intensity of the magnetic field of said first magnet and said second magnet, become outputs that mutually and complementarily change during the engagement/non-engagement of said tongue plate, and generate outputs mutually contracting with each other even in the respective engagement states; and
   a judgment unit for judging the engagement/non-engagement of said tongue plate and said buckle from the respective outputs of said first and second magnetic sensors.

9. A seatbelt device according to claim 8, wherein said first and second magnetic sensors are a hall IC, or MR IC.

* * * * *